(12) United States Patent
O'Connor

(10) Patent No.: US 8,465,557 B2
(45) Date of Patent: *Jun. 18, 2013

(54) PROCESS FOR MAKING BIO-OILS AND FRESH WATER FROM AQUATIC BIOMASS

(75) Inventor: Paul O'Connor, Hoevelaken (NL)

(73) Assignee: KiOR, Inc., Pasadena, TX (US)

( * ) Notice: Subject to any disclaimer, the term of this patent is extended or adjusted under 35 U.S.C. 154(b) by 101 days.

This patent is subject to a terminal disclaimer.

(21) Appl. No.: 12/746,140

(22) PCT Filed: Dec. 2, 2008

(86) PCT No.: PCT/EP2008/066629
§ 371 (c)(1),
(2), (4) Date: Aug. 12, 2010

(87) PCT Pub. No.: WO2009/071541
PCT Pub. Date: Jun. 11, 2009

(65) Prior Publication Data
US 2010/0293839 A1    Nov. 25, 2010

(30) Foreign Application Priority Data

Dec. 3, 2007 (EP) .................................... 07122114

(51) Int. Cl.
*C10L 1/00* (2006.01)
*C10B 53/02* (2006.01)

(52) U.S. Cl.
USPC .................. 44/307; 44/308; 44/605; 201/20; 201/25; 585/240

(58) Field of Classification Search
USPC ....................................... 208/44; 44/307, 308
See application file for complete search history.

(56) References Cited

U.S. PATENT DOCUMENTS

2009/0308787 A1 * 12/2009 O'Connor et al. .............. 208/44

* cited by examiner

*Primary Examiner* — Ellen McAvoy
*Assistant Examiner* — Latosha Hines
(74) *Attorney, Agent, or Firm* — Hovey Williams LLP

(57) ABSTRACT

A reactive distillation process is disclosed for converting aquatic biomass to a bio-oil. In the process a slurry of aquatic biomass is contacted with a particulate inorganic material. The mixture is heated to or above its boiling point. During the heating step biomass is converted to bio-oil. In a preferred embodiment water vapors emanating from the slurry are collected and condensed. The fresh water obtained may be used for irrigation, in human domestic uses, and for human consumption.

21 Claims, No Drawings

PROCESS FOR MAKING BIO-OILS AND FRESH WATER FROM AQUATIC BIOMASS

RELATED APPLICATIONS

This application claims priority to PCT International Patent Application No. PCT/EP2008/066629, filed Dec. 2, 2008, which claims the priority benefit of European Patent Application No. 07122114.7, filed Dec. 3, 2007, both of which are hereby incorporated by reference in their entirety.

BACKGROUND OF THE INVENTION

1. Field of the Invention

The invention relates generally to the production of bio-oils from aquatic biomass. More particularly the invention relates to a process that can be carried out at a relatively low temperature and produces fresh water as a valuable by-product.

2. Description of the Related Art

Aquatic biomass has been recognized as a potential source of fuel. Methods for converting aquatic biomass generally belong to one of two classes: biochemical methods, such as fermentation, and thermochemical methods. The latter include direct combustion, heat decomposition, gasification, and liquefaction.

By its nature aquatic biomass contains considerable quantities of water. Some of the energy conversion processes require the removal of (most of) the water. An example is direct combustion, which requires that the aquatic biomass first be dewatered and dried, prior to its use as a combustion fuel. A drying step significantly adds to the cost and complexity of the process. Therefore, processes have been proposed that do not require the aquatic biomass to be dried.

WO 2007/101172 discloses a process for the production of ethanol from algae. The process requires starch producing algae. The process comprises a mechanical crushing step in which algae cells are crushed to make the starch accessible prior to the addition of fermentation yeast. Ethanol produced in the fermentation step is separated from the water by, for example, distillation.

Although the process disclosed in WO 2007/101172 does not require the removal of water from the aquatic biomass prior to the fermentation, it involves the difficult separation of ethanol from water. In addition, yeast fermentation puts constraints on the composition of the water feed in terms of salt content.

Dote et al., "Recovery of liquid fuel from hydrocarbon-rich microalgae by thermochemical liquefaction", Fuel 1994, pp 1855-1857, discloses a process for the liquefaction of *Botryococcus braunii*. The process is carried out in aqueous medium in an autoclave under a nitrogen atmosphere. Conversion experiments were carried out at 200, 300, and 340° C. Hydrocarbons produced in the process were separated from the water phase by hexane extraction. The use of nitrogen, the high pressure, and the hexane extraction step make this process uneconomical for industrial scale conversion of aquatic biomass.

Yang et al., "Analysis of energy conversion characteristics in liquefaction of algae. Resources". Conservation and Recycling 43 (2004) 21-33, disclose a process for the liquefaction of *Microcystis viridis*. The reaction is carried out in an autoclave at 300 or 340° C. The pressure of the autoclave was 10-20 MPa in order to decrease the water evaporation. The reaction mixture was extracted with chloroform.

Thus, there is a particular need for a process for converting aquatic biomass to bio-oil that does not require the pre-drying of the biomass. There is a further need for such a process that can be carried out at atmospheric or near-atmospheric pressures. There is a further need for a process that does not require an expensive separation step for removing water from the reaction product. Ideally, water is recovered in a form that allows its use in agriculture or for human consumption.

BRIEF SUMMARY OF THE INVENTION

The present invention addresses these problems by providing a reactive distillation process for the conversion of aquatic biomass to a bio-oil, said process comprising the steps of:
a) providing a slurry comprising aquatic biomass and water;
b) contacting the biomass with a particulate inorganic material;
c) heating the slurry to its boiling point Another aspect of the invention comprises a method for capturing water vapors produced in step c) and converting the vapors to fresh water by condensation. Heat recovered during the condensation step may be recycled into the process. The fresh water produced in the process may be used in agriculture or for human consumption.

DESCRIPTION OF ILLUSTRATIVE EMBODIMENTS

The following is a description of certain embodiments of the invention, given by way of example only.

Aquatic biomass is an attractive source of energy because algae are far more efficient than land-based plants in the conversion of $CO_2$ to carbohydrates. However, growing algae requires large amounts of water and sunlight. Geographic areas that receive plentiful sunlight tend to be water-poor. It is an important advantage of the present invention that salt water, such as sea water, or brackish water may be used for the algae culture.

The process of the present invention does not pose any particular restrictions on the composition of the aquatic biomass. In general micro-algae are fast growing, but are more difficult to separate from the water in which they grow.

Other algae, such as sea weed, allow excess water to be readily drained. As they are more fiber-forming than micro-algae they tend to require more mechanical energy in the conversion process.

In general, the selection of the algae to be grown depends on factors such as:
The availability of sea water or sweet water;
The availability of a market for fresh water produced in the process;
The price of fresh water in that market;
The desired composition of the bio-oil.

The main feed for the process is a slurry of aquatic biomass. In many cases the slurry may be obtained by collecting algae from the pond in which they are grown, and subjecting them to a mild dewatering step, for example by passing the algae over a foraminous screen. Excess water drains away by gravity. In general, the slurry obtained contains from about 10 to about 35 wt % water.

In some cases it may be desirable to subject the algae to a particle size reduction step, such as chopping. This may be the case if the algae are of a fibrous nature. It will be appreciated that this particle size reduction step may be combined with the step of contacting the aquatic biomass with a particulate inorganic material, as described in more detail herein below.

The step of contacting the slurry of aquatic with the particulate inorganic material may be a simple mixing step. In many cases it is preferred to exert mechanical action on the biomass in the presence of the particulate inorganic material so as to provide a more intimate mixing of the biomass and the particulate inorganic material. Examples of such mechanical action include kneading, milling, crushing, extruding, chopping, and combinations thereof.

In general, the mechanical action, in addition to providing a more intimate contact between the aquatic biomass and the particulate inorganic material, also reduces the particle size of the aquatic biomass and crushes the cells of the aquatic biomass. Both effects are desirable, as they aid in the subsequent conversion of the biomass to bio-oil.

The particulate inorganic material may be inert, or it may have catalytic properties. For the purpose of the present invention, sand particles ($SiO_2$) are considered inert. Particulate inorganic material is considered having catalytic properties if it increases the rate of conversion of aquatic biomass to bio-oil under typical conversion conditions (e.g., 100° C. at atmospheric pressure) as compared to sand particles. It will be understood that "sand" obtained form a natural source may contain materials other than $SiO_2$, such as iron oxide ($Fe_2O_3$), which may give it catalytic properties.

Preferred for use herein are particulate inorganic materials having catalytic properties. Examples include clay, layered metal hydroxy-oxides, zeolites, aluminas, silica-aluminas, hydrotalcite and hydrotalcite-like materials, and the like. Inexpensive waste products from other processes may be used, such as spent grit from sandblasting processes, spent catalysts from petrochemical processes, and the like.

Particularly preferred are alkaline materials, in particular alkaline materials comprising Al, Mg, Ca, or a combination thereof. In order to increase the alkalinity of the slurry a soluble alkaline material may be added. Preferred are alkaline materials comprising Na or K, in particular KOH, $K_2CO_3$, NaOH, $Na_2CO_3$, or $Na_2O$.

After contacting the slurry with the particulate inorganic material the slurry is heated to its boiling point. In general a temperature of less than 200° C. is sufficient, temperatures of less than 150° C. being preferred. Corresponding steam pressures are 15.5 bar and 4.7 bar, respectively.

In a highly preferred embodiment the heating step is carried out at atmospheric pressure and a boiling point of about 100° C. This particular embodiment does not require sophisticated materials to withstand elevated pressures.

In an alternate embodiment the heating step is carried out at a reduced pressure, corresponding to a boiling point of less than 100° C. This embodiment has the advantage that less energy is required for heating the slurry.

It will be appreciated that salt water, such as sea water, may be present in the slurry. As will be explained below, fresh water is produced via evaporation and condensation of water from the slurry. The use of sea water therefore does not impair the fresh water production of the present invention. The use of sea water may be preferred for reasons of availability.

In a preferred embodiment, water vapors emanating from the boiling slurry are collected and condensed to fresh water. This step is advantageously carried out in a distillation column. The distillation column may contain a packing material, preferably a catalytic packing material. During condensation the water vapors release significant quantities of energy in the form of heat. This heat may be used in the process, for example for pre-heating the slurry of step c).

Fresh water obtained in the process is sufficient purity to be used in agriculture, for example irrigation, without further purification. The fresh water may also be used for human household use, such as washing and cleaning. It may even be used for human consumption, although in certain cases additional purification may be required, such as when volatile bio-oil components become included in the water as a result of a steam distillation process.

The fresh water obtained in the process may also be used in growing aquatic biomass.

In addition to a water vapor stream, the process produces a light gas stream, a liquid bio-oil stream, and a tar-like slurry. In general the liquid bio-oil is mixed with the tar-like slurry. The process may comprise the additional step of separating the liquid bio-oil from the tar-like slurry. This may be accomplished by settlement and phase separation.

The bio-oil may be used as-is as a heating fuel, or may be further processed in a refining process to produce liquid fuels suitable for internal combustion engines.

The tar-like slurry comprises tar, unconverted aquatic biomass, the inorganic particulate material, and salt. The tar-like slurry may be burned to produce heat and ash. The heat may be used in the reactive distillation process. The ash may be added to the slurry of steps b) or c). If desired, salt may be removed from the ash by spraying with water and draining the brine from the ash.

Thus, the invention has been described by reference to certain embodiments discussed above. It will be recognized that these embodiments are susceptible to various modifications and alternative forms well known to those of skill in the art.

What is claimed is:

1. A reactive distillation process for the conversion of aquatic biomass to a bio-oil, said process comprising the steps of:
    a) providing a slurry comprising aquatic biomass and water;
    b) contacting the biomass with a particulate inorganic material;
    c) subjecting the slurry to reactive distillation, wherein the reactive distillation includes heating the slurry up to or above its boiling point and subjecting the heated slurry to separation in a distillation column to thereby produce a first product stream comprising residual water and a second product stream comprising a bio-oil.

2. The process of claim 1 wherein step b) comprises exerting mechanical action on the biomass in the presence of the particulate inorganic material.

3. The process of claim 2 wherein the mechanical action comprises kneading, milling, crushing, extruding, or a combination thereof.

4. The process of claim 1 wherein the inorganic particulate material has catalytic properties.

5. The process of claim 1 wherein the inorganic particulate material comprises an alkaline material selected from Al, Mg, Ca, or a combination thereof.

6. The process of claim 1 wherein the slurry of step c) further comprises a soluble alkaline material.

7. The process of claim 6 wherein the soluble alkaline material comprises K or Na.

8. The process of claim 7 wherein the soluble alkaline material is NaOH or $Na_2CO_3$.

9. The process of claim 1 wherein the boiling temperature is less than 200° C.

10. The process of claim 1 wherein the slurry of step a) comprises sea water.

11. The process of claim 1 wherein the residual water formed in step c) is in the form of water vapor, wherein at least a portion of the water vapor is collected and condensed to fresh water.

12. The process of claim 1 wherein step c) further produces a third product stream comprising a light gas, wherein the second product stream further comprises a tar-like slurry, wherein said tar-like slurry comprises tar, unconverted aquatic biomass, inorganic particulate material, and salt.

13. The process of claim 12 comprising the additional step of: d) separating the bio-oil from the tar-like slurry.

14. The process of claim 12 comprising the additional step of burning the tar-like slurry to produce heat and ash.

15. The process of claim 14 wherein at least part of the ash is added to the slurry of step c).

16. The process of claim 1 wherein the distillation column contains catalytic packing material.

17. The process of claim 1 wherein step c) is carried out at sub-atmospheric pressure.

18. The process of claim 11 wherein heat dissipated by the condensing of the water vapor is used to pre-heat the slurry of step c).

19. The process of claim 1 wherein the slurry of step c) comprises at least about 10 weight percent of the water.

20. The process of claim 1 wherein the slurry of step a) is subjected to a dewatering step prior to step b), wherein the dewatering step comprises passing the slurry through a screen.

21. The process of claim 1 wherein the boiling temperature is less than 150° C.

* * * * *